United States Patent
Cimino et al.

(10) Patent No.: US 11,275,911 B2
(45) Date of Patent: Mar. 15, 2022

(54) TAG, RELATED METHOD AND SYSTEM FOR IDENTIFYING AND/OR AUTHENTICATING OBJECTS

(71) Applicant: STMICROELECTRONICS S.r.l., Agrate Brianza (IT)

(72) Inventors: Carlo Cimino, Naples (IT); Marco Alfarano, Naples (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 16/775,094

(22) Filed: Jan. 28, 2020

(65) Prior Publication Data
US 2020/0234013 A1    Jul. 23, 2020

Related U.S. Application Data

(63) Continuation of application No. 15/199,547, filed on Jun. 30, 2016, now Pat. No. 10,586,085.

(30) Foreign Application Priority Data

Oct. 26, 2015    (IT) .................... 102015000065203

(51) Int. Cl.
*G06K 7/10*    (2006.01)
*H04L 9/06*    (2006.01)
(Continued)

(52) U.S. Cl.
CPC ..... *G06K 7/10366* (2013.01); *G06K 7/10297* (2013.01); *H04L 9/0625* (2013.01);
(Continued)

(58) Field of Classification Search
CPC ............ G06K 7/10366; G06K 7/10297; H04L 9/0625; H04L 9/0631; H04L 9/0643; H04L 9/3234; H04L 63/0435
(Continued)

(56) References Cited

U.S. PATENT DOCUMENTS 6,026,165 A * 2/2000 Marino .............. G07C 9/00182
                                                380/273
7,921,180 B2 * 4/2011 Greer ...................... G06Q 30/02
                                                709/217
(Continued)

FOREIGN PATENT DOCUMENTS

EP         2 913 973 A1    9/2015

OTHER PUBLICATIONS

Italian Search Report, dated Jun. 29, 2016, for Italian Application No. UB20155318, 9 pages.

*Primary Examiner* — Michael G Lee
*Assistant Examiner* — David Tardif
(74) *Attorney, Agent, or Firm* — Seed IP Law Group LLP

(57) ABSTRACT

A tag adapted to be applied to an object is disclosed. The tag includes a wireless communication interface, a processor and a memory. A univocal code, a cipher key and a count value are store in the memory. The tag generates a dynamic code as a function of the cipher key and the count value. Next, the tag varies the count value according to a determined operation, and stores the varied count value in the memory. The tag transmits the univocal code and the dynamic code to a reader device. The tag may transmit the univocal code and the dynamic code in a URL.

24 Claims, 4 Drawing Sheets

(51) Int. Cl.
*H04L 29/06* (2006.01)
*H04L 9/32* (2006.01)

(52) U.S. Cl.
CPC .......... *H04L 9/0631* (2013.01); *H04L 9/0643* (2013.01); *H04L 9/3234* (2013.01); *H04L 63/0435* (2013.01); *H04L 63/0442* (2013.01); *H04L 2209/805* (2013.01)

(58) Field of Classification Search
USPC ...................................................... 235/451
See application file for complete search history.

(56) References Cited

U.S. PATENT DOCUMENTS

| | | | |
|---|---|---|---|
| 8,412,837 B1* | 4/2013 | Emigh | G06F 21/6209 709/229 |
| 10,664,843 B2* | 5/2020 | Narayan | G06Q 20/02 |
| 2004/0060977 A1* | 4/2004 | Proennecke | G07F 7/0886 235/375 |
| 2006/0012473 A1 | 1/2006 | Bishop et al. | |
| 2006/0237528 A1 | 10/2006 | Bishop et al. | |
| 2012/0018506 A1* | 1/2012 | Hammad | G06Q 30/06 235/375 |
| 2013/0193201 A1* | 8/2013 | Bradley | G06Q 30/0623 235/375 |
| 2016/0018996 A1* | 1/2016 | Doumen | G06F 3/0673 714/766 |
| 2016/0070917 A1* | 3/2016 | Rozenberg | H04L 63/0414 726/26 |

* cited by examiner

TAG, RELATED METHOD AND SYSTEM FOR IDENTIFYING AND/OR AUTHENTICATING OBJECTS

BACKGROUND

Technical Field

Embodiments of the present disclosure relate to techniques for identifying and/or authenticating objects.

Description of the Related Art

FIG. 1 shows a typical system for object identification.

In the example considered, a tag 402 is fixed to an object 40. Usually, the tag 402 stores an alphanumeric sequence, or generally a code C. For example, the tag 402 may be a bar-code, such as a QR code, or an RF-ID (Radio-frequency identification) tag.

In particular, in the context of univocal identification, the code C stored in the tag 402 is a univocal code associated with a given object 40, e.g., each tag 402 identifies univocally a respective object 40. For example, the code C may correspond to the model and serial number of the object 40.

Thus, in order to permit an identification of a given object, the codes C and the respective data D associated with objects are stored in a database 50. For example, the data D stored for a given code C may comprise the model type, the serial number (if not contained already in the code C), the production year, the production location, etc. For example, in FIG. 1, these information may be organized in the form of a table, comprising the codes C1, C2, etc., and the respective data D1, D2, etc.

Accordingly, some kind of reader device 10 is used to acquire the code C stored in the tag 402 and to obtain the information stored for the respective code. For example, as shown in FIG. 1, the reader device 10 may comprise for this purpose a sensor 112, such as an optical sensor or a RF-ID reader, and a processing unit 102.

Accordingly, once having received the code C from the tag 402, the processing unit 102 may determine via the database 50 the data stored for the given code. Next, the respective information may be shown to a user, e.g., by means of a user interface 110 of the device 10.

Accordingly, the above solution may be used to obtain the identification of a given object.

However, the code C stored in the tag 402 is static, e.g., the tag 402 will provide for subsequent reading operations always the same code C. Accordingly, the above solution is insufficient in order to permit a reliable verification of the authenticity of the object 40, e.g., because the tag 402, in particular the code C, could be copied and applied also to other non-authentic objects.

BRIEF SUMMARY

An embodiment facilitates identifying and/or authenticating objects.

For example, in various embodiments, a tag comprises a processor, a memory and a wireless communication interface, such as a Near Field Communication interface. For example, a univocal code, a cipher key and a count value may be stored in the memory during an activation procedure.

In various embodiments, the tag generates a dynamic code as a function of the cipher key and the count value stored in the memory. Generally, the dynamic code may be generated using any symmetric or asymmetric encryption method or a hashing function. For example, in various embodiments, a temporary code is generated by encrypting the univocal code and the count value with the cipher key by means of a cryptographic algorithm, for example DES or AES encryption method, and a subset of the characters of the temporary code are selected as dynamic code.

In various embodiments, the tag varies (prior or after the encoding operation) the count value according to a determined operation (e.g., increases or decreases the count value) and stores the varied count value in the memory. Accordingly, each encoding operation may provide a different dynamic code. The determined operation may be predetermined.

In various embodiments, the tag transmits the univocal code and the dynamic code to a reader device (10a). For example, the reader device may be a mobile device, such as a smartphone or a tablet.

In various embodiments, the memory of the tag stores also a Fully Qualified Domain Name (FQDN) and the tag transmits a Uniform Resource Locator (URL) to the reader device, which comprises the Fully Qualified Domain Name, the univocal code and the dynamic code. Accordingly, also the URL changes for each transmission operation.

An embodiment of a tag may be particular useful for identifying and/or authenticating objects. In fact, the same univocal code, cipher key and count value stored initially in the tag may also be stored in a database, wherein a respective cipher key and count value (and possible other data) are associated with each univocal code. Accordingly, the value of the count value in the database corresponds initially to the value of count value stored in the tag.

Accordingly, once having transmitted the univocal code and the dynamic code to a reader device, the reader device will access a webpage with a given URL (which, e.g., may correspond to the URL transmitted by the tag). Accordingly, the server will receive from the reader device a request to a URL, which comprises the univocal code and a dynamic code. Based on this information, the server may test whether the database contains the univocal code comprised in the URL.

For example, in case the database contains the univocal code, the server may verify whether the dynamic code is correct. For this purpose, the server may perform substantially the same operation performed also by the tag. For example, the server may retrieve the cipher key and the count value associated with the univocal code from the database and may generate a second dynamic code as a function of the cipher key and the count value stored in the database. Next, the server may test whether the dynamic code transmitted by the tag and comprised in the URL corresponds to the second dynamic code generated by the server.

In case the dynamic codes correspond, the server may show a webpage containing a confirmation message and/or the data associated with the univocal code. Moreover, the server may vary the count value according to the same operation performed by the tag and store the varied count value in the database.

Conversely, in case the database does not contain the univocal code comprised in the URL, the server may show a webpage containing an error message.

Moreover, in various embodiments, e.g., in case the dynamic codes do not correspond, the server may repeat the encoding operation for new count values until the dynamic codes correspond or a maximum number of iterations has been reached. For example, in case the maximum number of iterations has been reached, the server may show again a webpage containing an error message, which substantially indicates that the tag/object is not authentic.

In an embodiment, a device comprises: a wireless communication interface; a memory; and processing circuitry which, in operation: generates a first dynamic code based on a key and a first value stored in the memory; applies a determined operation to the first value to generate a modified first value and replaces the first value stored in the memory with the modified first value; and generates signals to cause the wireless communication interface to transmit the first dynamic code and a univocal code stored in the memory. In an embodiment, said memory stores a Fully Qualified Domain Name (FQDN), and said transmitting said univocal code and said dynamic code comprises: transmitting an Uniform Resource Locator (URL) to a reader device, said URL comprising said Fully Qualified Domain Name, said univocal code and said first dynamic code. In an embodiment, said processing circuitry, in operation, generates the first dynamic code using one or more of: a symmetric encryption function; an asymmetric encryption function; and a hashing function. In an embodiment, the processing circuitry, in operation, generates said first dynamic code by: generating a temporary code by encrypting said univocal code and said first count value with said key using a cryptographic algorithm; and selecting a subset of the characters of said temporary code as said dynamic code. In an embodiment, the cryptographic algorithm comprises at least one of: a Data Encryption Standard (DES) algorithm; and an Advanced Encryption Standard (AES) algorithm. In an embodiment, said wireless communication interface comprises a Near Field Communication interface. In an embodiment, the processing circuitry, in operation, generates the first dynamic code before generating the modified first value.

In an embodiment, a method comprises: generating, using processing circuitry of a tag, a first dynamic code based on a first key and a first value stored in a memory of the tag; applying a determined operation to the first value to generate a modified first value and replacing the first value stored in the memory with the modified first value; and transmitting, using a wireless communication interface of the tag, the first dynamic code and a univocal code stored in the memory of the tag. In an embodiment, said memory stores a Fully Qualified Domain Name (FQDN), and said transmitting said univocal code and said dynamic code comprises: transmitting an Uniform Resource Locator (URL) to a reader device, said URL comprising said FQDN, said univocal code and said first dynamic code. In an embodiment, generating the first dynamic code comprises applying one or more of: a symmetric encryption function; an asymmetric encryption function; and a hashing function. In an embodiment, the generating said first dynamic code comprises: generating a temporary code by encrypting said univocal code and said first count value with said first key using a cryptographic algorithm; and selecting a subset of the characters of said temporary code as said dynamic code. In an embodiment, the cryptographic algorithm comprises at least one of: a Data Encryption Standard (DES) algorithm; and an Advanced Encryption Standard (AES) algorithm. In an embodiment, said wireless communication interface comprises a Near Field Communication interface. In an embodiment, the method comprises: receiving, at a server, a Uniform Resource Locator (URL) request including the transmitted first dynamic code and univocal code; determining, by the server, whether a database contains said univocal code included in the received URL; and in response to a determination that the database contains the univocal code included in the received URL: retrieving a second key and a second value stored in the database and associated with said univocal code included in the received URL; generating a second dynamic code as a function of said retrieved second key and second value stored in said database; comparing said first and said second dynamic codes; and based on the comparison, selectively applying the determined operation to the second value to generate a modified second value and replacing the second value stored in the database with the modified second value. In an embodiment, the method comprises: transmitting the URL by the tag to a reader device; and transmitting the URL by the reader device to the server. In an embodiment, said reader device is one of a smartphone and a tablet. In an embodiment, the method comprises: in response to a determination that the database does not contain the univocal code included in the received URL, transmitting, by the server, a webpage containing an error message. In an embodiment, the method comprises: when the comparison indicates said first and said second dynamic code do not correspond, repeating the following operations until the comparison indicates said first and said second dynamic codes correspond or a threshold number of iterations has been reached: applying the determined operation to the second value to generate a modified second value; and generating a new second dynamic code as a function of said key and said modified second value. In an embodiment, the method comprises: when the threshold number of iterations has been reached, transmitting, by the server, a webpage containing an error message.

In an embodiment, a system comprises: an object; a tag associated with the object, the tag including: a wireless communication interface; a memory; and processing circuitry which, in operation: generates a first dynamic code based on a key and a first value stored in the memory; applies a determined operation to the first value to generate a modified first value and replaces the first value stored in the memory with the modified first value; and generates signals to cause the wireless communication interface to transmit the first dynamic code and a univocal code stored in the memory. In an embodiment, the tag is embedded in the object. In an embodiment, the system comprises: a server, which, in operation, responds to a Uniform Resource Locator including the transmitted first dynamic code and the univocal code by authenticating the object based on the received URL.

In an embodiment, a system comprises: an object; means for transmitting a univocal code associated with the object and a first dynamic code generated based on a key and a first stored value, wherein the first stored value is updated after the first dynamic code is generated. In an embodiment, the means for transmitting is embedded in the object. In an embodiment, the system comprises: means for responding to a Uniform Resource Locator including the transmitted first dynamic code and the univocal code by authenticating the object based on the received URL.

BRIEF DESCRIPTION OF THE SEVERAL VIEWS OF THE FIGURES

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 2:
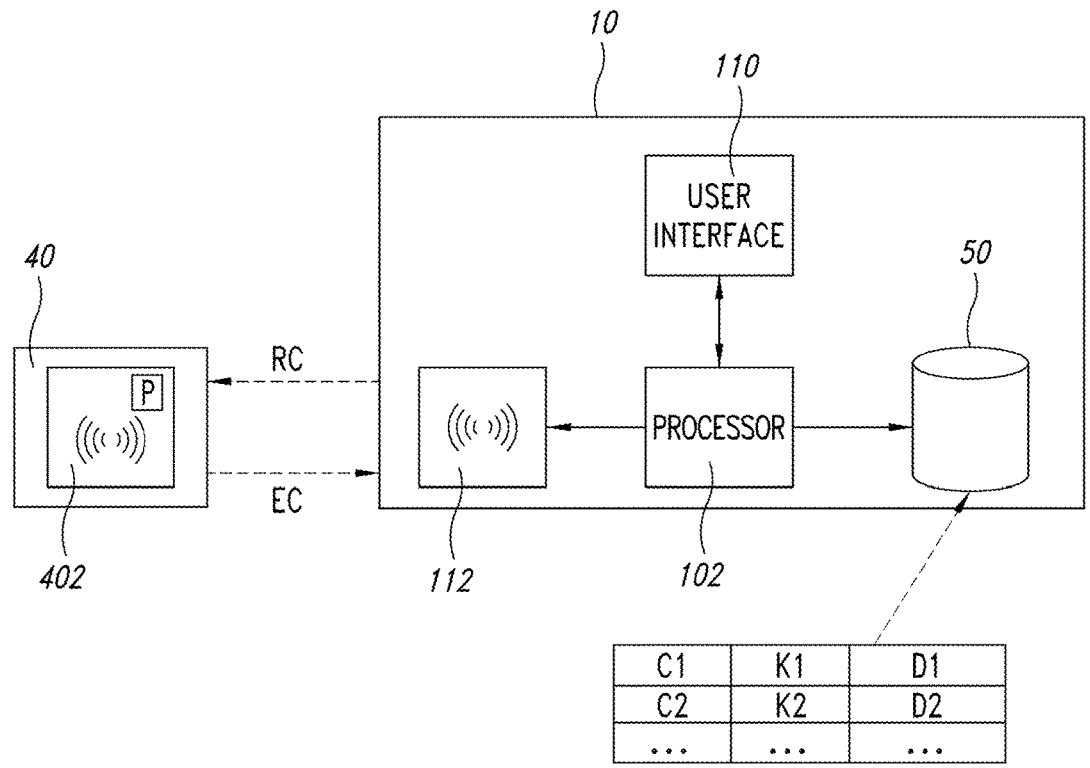
FIG. 2 shows an embodiment of system comprising a tag and a reader device.

FIG. 2 shows an embodiment which facilitates reliably verifying the authenticity of an object 40.

Specifically, in this embodiment the communication between the tag 402 and the reader device 10 is based on a bi-direction communication and also the tag 402 comprises a processing unit P (e.g., circuitry).

Substantially, in this case, a symmetric or asymmetric encryption technique is used in order to verify the authenticity of the tag 402.

For example, the tag 402 may have stored in addition to the code C a cipher key K, and the same cipher key K may also be stored for the respective code C in the database 50. For example, in FIG. 2, a respective cipher key K1, K2, etc., is stored for each code C1, C2, etc.

Figure 1:
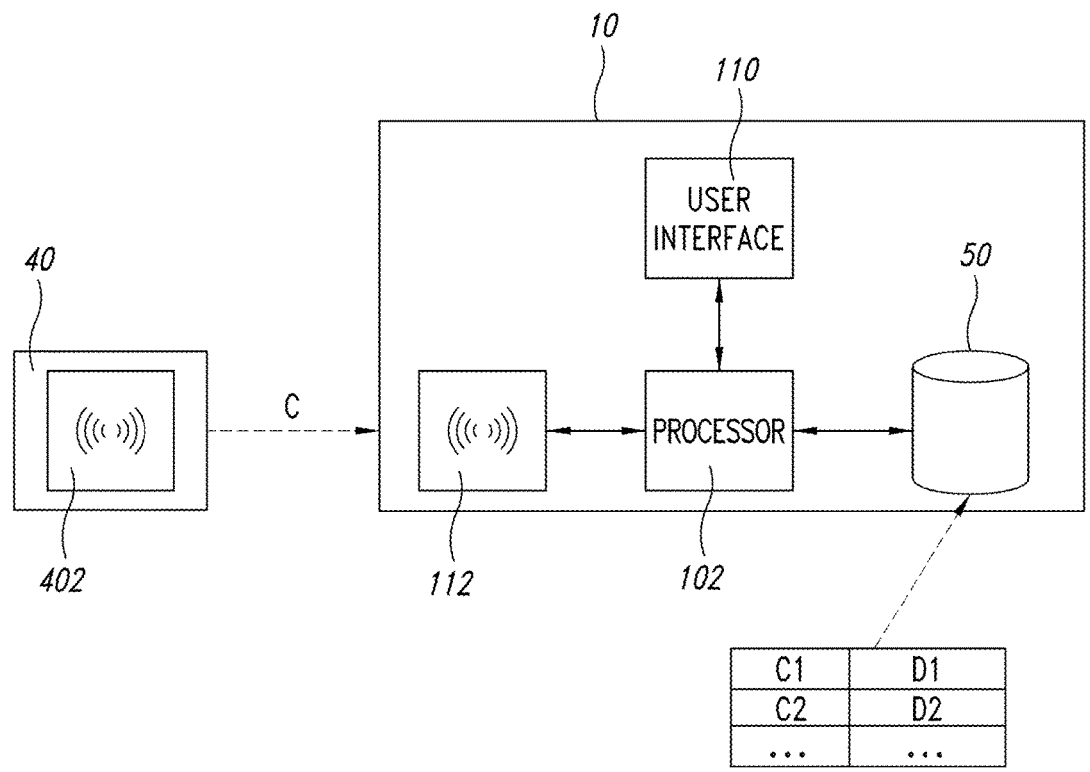
FIG. 1 shows a tag and a reader device and has already been described in the foregoing.

Accordingly, after having obtained the code C from the tag 402 (e.g., as shown in FIG. 1), the reader device 10 may obtain the cipher key K associated with the code C from the database 50.

Next, in order to verify the tag 402, a random key RC is sent to the tag 402 and the processing unit of the tag 402 performs a given operation with this random key RC and the cipher key K, such as a hash function or an encryption of the random key RC with the cipher key K. The result of the calculation EC is sent back to the reader device 10. The reader device 10 performs the same operation with the random key RC and the cipher key K and thus may determine whether the results of the calculations correspond, thereby verifying whether the tag 402 has access to the correct cipher key K, which is not directly accessible, and thus may not be copied easily.

Thus, in order to implement techniques for authenticating the tag 402, a bi-direction communication is required and the reader device 10 has to be able to perform the encryption operation also performed by the tag 402.

In the following FIGS. 3 to 7 parts, elements or components which have already been described with reference to FIGS. 1 to 2 are denoted by the same references previously used in such Figures; the description of such previously described elements will not be repeated in the following in order not to overburden the present detailed description.

As mentioned in the foregoing, embodiments of the present disclosure facilitate verifying the authenticity of a tag 402a. For example, such a tag may be fixed or incorporated in an object 40. Accordingly, by verifying the authenticity of the tag, a user may, e.g., verify whether the object 40 is genuine.

In various embodiments, the reader device 10a may be a mobile device, such as a smart-phone or a tablet.

Figure 3:
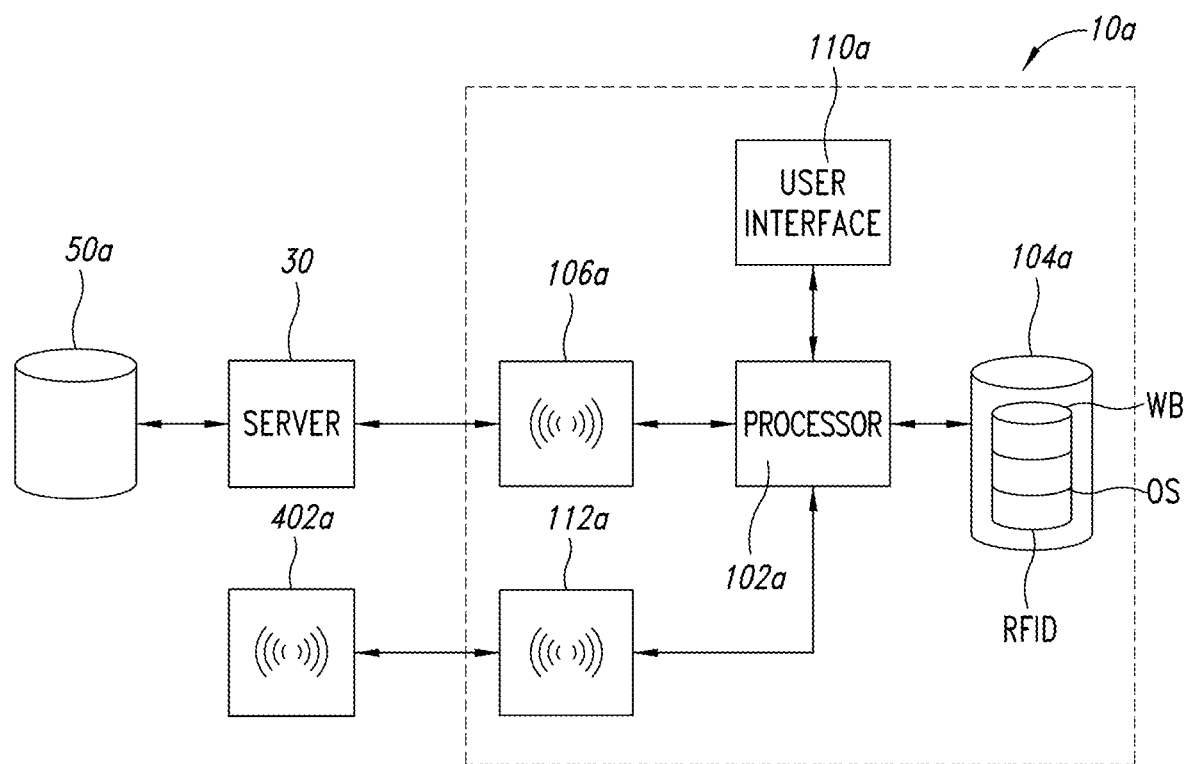
FIG. 3 shows an embodiment of system comprising a tag, a reader device and a server adapted to identify and/or authenticate objects.

For example, as shown in FIG. 3, a typical user equipment or mobile equipment 10a comprises one or more processors 102a connected to one or more memories 104a. The device 10a comprises moreover at least one communication interface 106a in order to exchange data with a server 30. Specifically, in various embodiments, the server 30 manages database 50a containing information related to the tags 402a to be authenticated.

For example, the communication interface 106a may be a mobile communication interface for radio communication over a radio channel with a base station. For example, the mobile communication interface 106a may comprise a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver.

Generally, the communication interface 106a may be any wired or wireless communication interface, such as an Ethernet or Wi-Fi communication module, which permits connection to the server 30. Thus, generally, the communication between the server 30 and the communication interface 106a may be established and realized through any suitable Local Area Network (LAN) and/or Wide Area Network (WAN), such as the Internet.

The mobile device 10a may also comprise a user interface 110a, such as a touchscreen or keypad.

In the memory 104a may be stored, e.g., an operating system OS being executed by the processor 102a and which manages the general functions of the device 10a, such as the management of the user interface 110a and/or the communication interface 106a. The memory 104a may also contain applications being executed by the operating system OS. For example, in various embodiments, the memory 104a comprises a web browser application WB.

In the embodiments considered, the device 10a comprises moreover a second communication interface 112a for communication with the tag 402a. Specifically, in various embodiments, the communication interfaces 112a and 402a are short range wireless communication interfaces. For example, in various embodiments, the communications interfaces 112a and 402a are Near Field Communication (NFC) interfaces.

Accordingly, also the mobile device 10a could be used to implement the authentication solution shown in FIG. 2. Specifically, the database 50a may comprise a cipher key K and the respective data D for a plurality of codes C. Once having obtained the code C from the tag 402a, the mobile device 10a may communicate with the server 30 in order to obtain the cipher key K associated with the code C. Next, the mobile device 10a may transmit a random code RC to the tag 402a and obtain the corresponding encoded response EC. Thus, by performing the same encoding operation, the mobile device 10a may verify whether the tag 402a has access to the correct cipher key K.

However, this solution has several drawbacks. First of all, the mobile device 10a has to be configured to perform a bi-directional communication with the tag 402a. Moreover, the mobile device 10a has to be able to perform the encoding operation performed also by the tag 402a. Accordingly, in order to perform the above operations, the mobile device 10a would have to download a dedicated application.

Accordingly, a different solution may be desirable, in which no specific application has to be installed on the mobile device 10a, merely using the capabilities of a standard mobile device 10a.

As mentioned in the foregoing, modern mobile devices 10a often comprise a NFC interface. While, the NFC standards cover communication protocols and data exchange formats, they are based mainly on the existing RF-ID standards. For example, one of the operations commonly supported by a mobile device 10a is the reading of a code, e.g., an alphanumeric sequence, from a RF-ID/NFC tag. Specifically, in this case, the NFC interface 112a is used as an RFID reader. For example, in various embodiments, the mobile device 10a, in particular the memory 104a contains a RF-ID reader application RFID, which facilitates obtaining the code transmitted from a conventional RF-ID tags.

Moreover, as mentioned in the foregoing, the mobile device 10a may include a web browser application WB. Accordingly, the mobile device 10a, e.g., the RF-ID reader application RFID, may be configured to automatically open the web browser application WB when the code received from the tag 402a contains a URL (Uniform Resource Locator), e.g., a link a server can reply to with a webpage.

Thus, in various embodiments, the tag 402a is configured to transmit a URL. For example, the URL may have the following format:

www.issuername.com/itemname/Ca where "www.issuername.com" may correspond to a Fully Qualified Domain Name (FQDN) of the server 30, "itemname" is optional and may correspond to the model type or number, and "Ca" represents the univocal identifier of the tag 402a and may correspond, e.g., to the serial number of the tag or the associated object. Generally, the "itemname" is optional, because the model type or number may also be derivable from the code Ca, e.g., in case the code Ca is univocal for all products of a given producer.

Accordingly, once having obtained the URL from the tag 402a, the mobile device 10a, in particular the RF-ID reader application RFID, will launch the web browser application WB, which in turn will access the URL received, e.g., the server 30.

The server 30 may analyze the requested URL, and determine whether the database 50a contains the specified code Ca in the database 50a and show a webpage. Specifically, in various embodiments, the server 30 may show:

in case the code Ca is not stored in the database 50a, an error message, or in case the code Ca is stored in the database 50a, a webpage containing the data D stored for the given code Ca.

Accordingly, in this case, no specific application has to be installed on the mobile device 10a and the operation of verifying the authenticity of the code Ca is performed by the server 30.

However, as mentioned with respect to FIG. 1, in this case, no reliable verification of the authenticity of the tag 402a would be possible, because the URL could be copied and stored on other (fake) tags.

Accordingly, instead of using a complex bi-direction communication as shown in FIG. 2, in various embodiments, the tag is configured to transmit a URL comprising a dynamic code DC. For example, in various embodiments, the tag 402a is configured to transmit a URL having the following format:

www.issuername.com/itemname/Ca/DC/ where "DC" may corresponds to a dynamic code, which may change for each reading operation.

Figure 4:
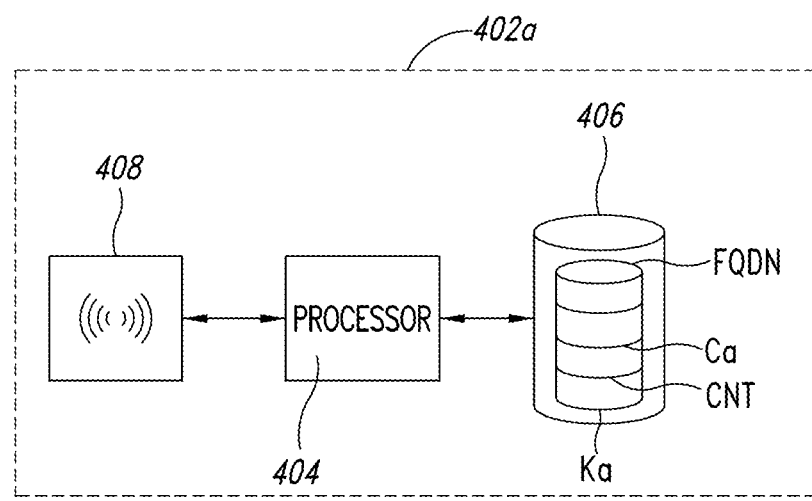
FIGS. 4 and 5 shows an embodiment of a tag in accordance with the present disclosure.

For example, as shown in FIG. 4, the tag 402a may comprise a processing unit 404, a non-volatile memory 406 (e.g., a flash memory) and a NFC communication interface 408. Specifically, the processing unit 404 is configured to transmit via the communication interface 408 an alphanumeric sequence comprising a URL, wherein the URL contains a static part and a dynamic part.

For example, in various embodiments, the static part of the authentication URL contains the web server address (e.g., the FQDN of the server 30, which may be stored in the memory 406) and the code Ca (which again may be stored in the memory 406), e.g., the tag serial number or any other number uniquely associated with the specific tag. For example, the static information may be written into the tag 402a, in particular the memory 406, before its issuance.

The dynamic part of the authentication URL, i.e., the dynamic code DC, is computed by the tag 402a at each reading.

For example, in various embodiments, the code DC is computed based on a counter value CNT and a cipher key Ka. For example, the cipher key Ka and an initial counter value CNT may also be stored in the memory 406. Specifically, in various embodiments, the initial count value is not zero, but a random or pseudorandom number.

Thus, in an embodiment, the values FQDN, Ca, and Ka remain fixed, and only the count value CNT is varied (e.g., is increased or decreased) at each reading operation.

For example, assuming a code Ca having 5 bytes (e.g., "0000345F87"), the static part of the URL could be:

www.issuername.com/itemname/0000345F87/

Conversely, longer sequences may typically be employed for the counter CNT and the cipher key Ka. For example, the initial count value CNT may have 11 bytes (e.g., "567143AB6789A5674DC5D8") and the cipher key Ka may have 16 byes (e.g., "009944A5C75C3289D5E79805C7121198").

Figure 5:
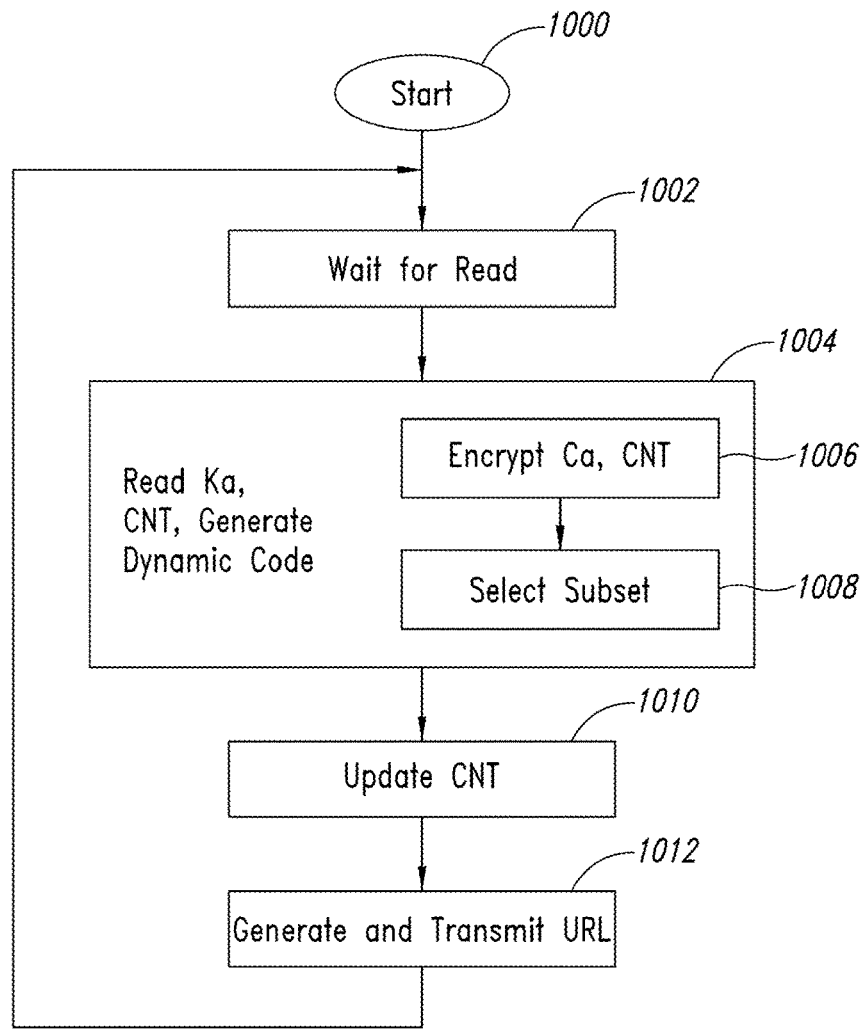

For example, as shown in FIG. 5, after a start step 1000, the tag 402a may wait for a reading operation at a step 1002.

Once a reading operation has been requested, at a step 1004, the tag 402a reads (at least) the cipher key Ka and the current counter value CNT from the memory 406 and generates the dynamic code DC as a function of (at least) the counter value CNT and the cipher key Ka.

Next, at a step 1010, the tag 402a is configured to vary the count value CNT according to a determined operation (e.g., increase or decrease), and the updated count value is stored in the memory 406. The determined operation may be predetermined.

At a step 1012, the tag 402a is configured to generate the complete URL comprising the domain name FQDN, possibly the field "itemname", the code Ca and the dynamic code DC, and transmit the URL via the communication interface 408. At the end of the step 1012, the procedure returns to 1002 to wait for the next read.

For example, in various embodiments, the dynamic code DC, which represents an authentication token, is computed at the step 1004 using an cryptographic algorithm applied to the code Ca (e.g., the tag serial number) and the current counter value CNT.

For example, in various embodiments, at a step 1006, the tag 402a is configured to encrypt the sequence comprising the code Ca and the count value CNT, e.g., "0000345F87 567143AB6789A5674DC5D8", with the cipher key Ka using an encryption method, e.g., AES (Advanced Encryption Standard) or DES (Data Encryption Standard), to generate a temporary sequence (e.g., "E422F6F410E02C2019748FB72547F2BD").

Next, at a step 1008, a subset of this sequence may be selected. For example, in an embodiment, the first five bytes of the temporary sequence are selected as dynamic code DC (e.g., "E422F6F410"). Generally, also other encoding methods may be used at the step 1006, such as any symmetric or asymmetric encryption method or hashing function (e.g., MD5), and also more complex operations may be performed at the step 1008 in order to select a subset of the characters of the encoded temporary sequence. Moreover, the step 1008 is option, and the dynamic sequence DC could also correspond to the temporary sequence.

Accordingly, the final URL generated at the step 1012 could be, for example:

www.issuername.com/itemname/0000345F87/
E422F6F410

The server 30, which represents an authentication server, receives the URL, and thus possibly the optional field "itemname", the code Ca and the dynamic authentication token DC. Thus, the counter value CNT and the cipher key Ka are not transmitted and the mobile device 10a does not gain access to these codes. Accordingly, brute-force attacks to discover these codes may be prevented.

Figure 6:
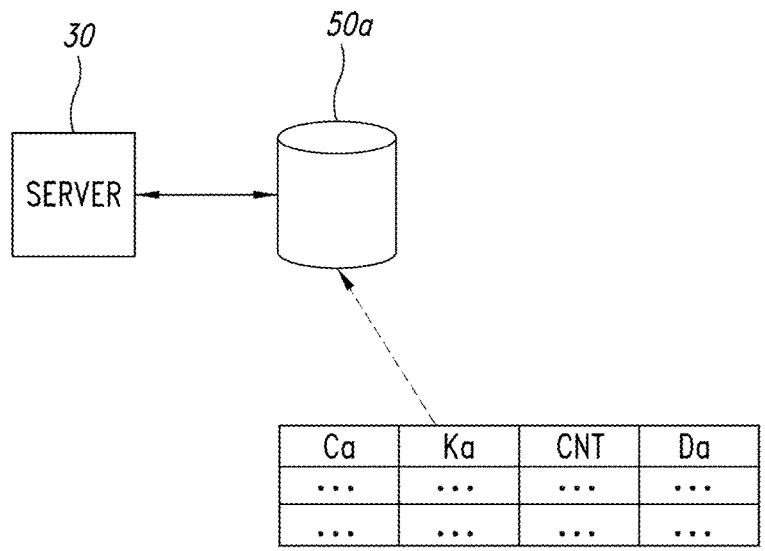
FIGS. 6 and 7 shows an embodiment of a server in accordance with the present disclosure.

In the embodiment considered, the authenticating server 30 stores in the database 50a not only the code Ca and the respective data Da, such as the production year, the production location, etc., but also the corresponding cipher key Ka and the initial count value CNT (see, e.g., FIG. 6). Generally, a plurality of tables may also be managed in the database 50a, e.g., a respective table for each possible value of the field "itemname".

Figure 7:
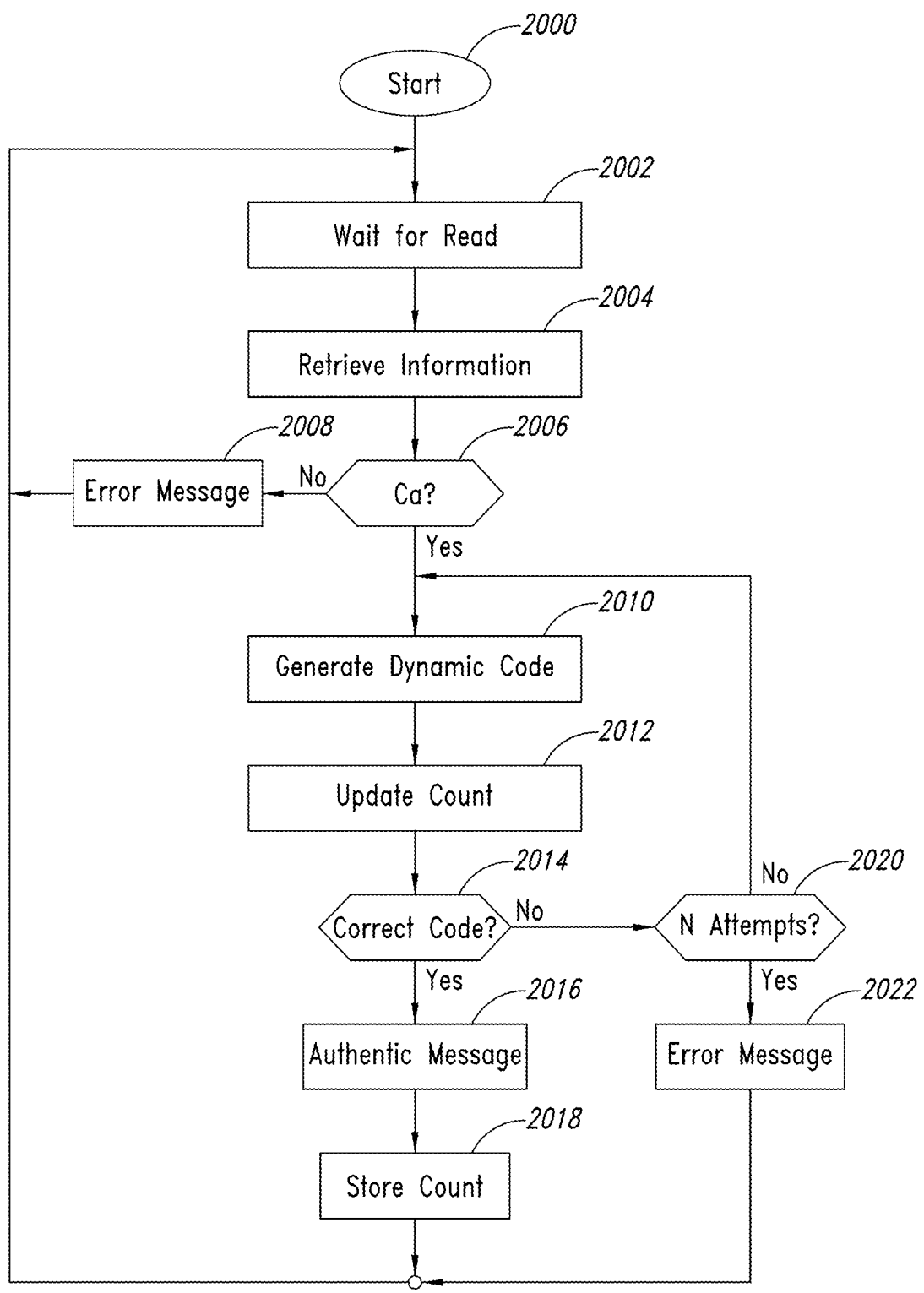

FIG. 7 shows in this respect the operations performed by the server 30 in an embodiment.

After a start step 2000, the server waits at a step 2002 that a new web page request is received, which contains at least one code Ca.

Next, the server determines at a step 2004 whether the code Ca exists in the database 50a and if possible retrieves the associated information from the database 50a, such as the cipher key Ka, the counter value CNT, and the data Da. At the step 2004, the server may use also the field "itemname" (if used), e.g., in order to select the correct table in the database 50.

Accordingly, at a step 2006, the server 30 may verify whether the code Ca exists in the database 50a.

In case, the code Ca does not exists in the database 50a (output "N" of the step 2006), the server 30 may show at a step 2008 a webpage containing an error message, which indicates that the tag 402a, and accordingly the associated object, may not be found, and the procedure returns to 2002.

Conversely, in case the code Ca exists in the database 50a (output "Y" of the step 2006), the server 30 generates the dynamic code, for example, the server may use the count value CNT and the cipher key Ka in order to perform at a step 2010 the same encoding operation also used by the tag 402a at the step 1004. For example, the server may encrypt the sequence composed of the code Ca and the count value CNT with the cipher key Ka by means of a cryptographic encryption (e.g., AES) and select the first five bytes of the temporary sequence provided by the encryption as the dynamic code DC.

Next, at a step 2012, the server 30 may vary (e.g., increase or decrease) the count value CNT in order to mirror the operation performed by the tag 402a.

Accordingly, at a step 2014, the server 30 may verify whether the webpage request contained the correct dynamic code DC.

In case the dynamic code DC is correct (output "Y" of the step 2014) the server 30 may show at a step 2016 a webpage containing a confirmation message, which indicates that the tag 402a is authentic.

Next the server may store at a step 2018 the updated count value CNT in the database 50a. Accordingly, in the embodiment considered, the server 30 stores only count values CNT which have been verified, because the dynamic code DC is only valid when the count values of both the server 30 and the tag 402a have the same value. At the end of the step 2018, the procedure proceeds again to the step 2002.

In case the dynamic code DC is wrong (output "N" of the step 2014), the server 30 may proceed to a second verification step 2020.

Specifically, this optional verification step 2020 is useful in order to repeat the verification for a given number of subsequent count values, because the count values stored in the server 30 and the tag 402a may not be aligned, for example because the server 20 did not received some authentication requests.

For example, in the embodiment considered, the server 30 verifies at the step 2020 whether a threshold number N of encoding operations has been performed.

In case the threshold number of encoding operations has not been reached (output "N" of the step 2020), the server 30 may return to the step 2010 and repeat a new encoding operation with the count value CNT updated at the step 2012.

Conversely, in case the threshold number of encoding operations has been reached (output "Y" of the step 2020) the server 30 may show at a step 2022 a webpage containing an error message, which indicates that the tag 402a, and accordingly the associated object, is not authentic, and the procedure returns to 2002.

Accordingly, in the embodiment considered, the authenticating server 30 verifies the authentication token DC by executing the same cryptographic algorithm with the same keys on the same code Ca (e.g., tag serial number) and the counter CNT stored in the database 50a. In case, the verification fails, the count value CNT is increased and a new verification is performed until the verification succeeds or a given threshold number of encoding operations has been reached. For example, for typical applications, this threshold number may be set to 1000.

As illustrated, the counter is increased temporarily to perform the verification, but the increased counter is stored in the DB only if the verification succeeds (see, e.g., step 2018 of FIG. 7). Accordingly, once a verification is successful the server will store the updated count value CNT, thereby aligning again the server 30 with the tag 402a, even in case several requests have been lost.

In various embodiments, the reliability of the verification may be further improved by performing one or more subsequent verifications to verify that the tag 402a does not return always the same data (e.g., it is not static).

For example, the authenticating server 30 may be configured to show during a first iteration at the step 2016 only a preliminary validity message and only in case a consecutive verification operation (with a different dynamic code DC), e.g., within a given time interval (e.g., 60 s), obtains again a positive result, the server 30 may show during the second iteration at the step 2016 a webpage containing a confirmation of validity. Conversely, if the time frame expires, the next authentication attempt may be considered again as the first of the required two verifications.

As mentioned in the foregoing, the webpage shown at the step 2016 usually contains an indication that the tag/object is authentic and the additional information Da stored for the given code Ca, such as commercial details regarding the item, item traceability data may be shown. Generally, this indication may also be implicit, e.g., by showing the data Da associated with the respective code Ca (and avoiding any error message). The webpage could also contain further information, such as the number of verification attempts and/or the contact details of the vendor.

One or more embodiments facilitate reducing problems associated with a significant amount of subsequent URLs being read from an authentic tag and stored in different fake tags. If one of the clone tags is authenticated and its updated count value is stored at the step 2018 in the database 50a, in an embodiment the server 30 is able to recognize that most of the other clone tags are false because they contain URLs based on older counter values. And, as soon as the authentic tag 402a is authenticated, all the clone tags are recognized as false.

In various embodiments, the security of the solution may be further improved by using tags 402a, which have to be activated.

For example, in various embodiments, an inactivated tag 402a initially, does not provide a URL or merely a static URL, such as www.issuername.com/itemname/Ca/

In this case, the server 30 may be configured to determine whether the URL contains a dynamic code DC and, in case the URL does not contain a dynamic code DC, the server may show a webpage containing an error message, which indicates that the tag (identified with a given code Ca) is not activated.

In various embodiments, the activation can be made only by authorized entities, such as producer of the object 40 or the vendor, e.g., after performing mutual authentication with proper applications.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a wireless communication interface;
a memory; and
processing circuitry which, in operation:
generates a first dynamic code based on a key and a first value stored in the memory;
applies a determined operation to the first value to generate a modified first value and replaces the first value stored in the memory with the modified first value;
generates signals to cause the wireless communication interface to transmit the first dynamic code and a univocal code stored in the memory;
generates a second dynamic code based on the key and the modified first value stored in the memory;
applies the determined operation to the modified first value to generate a modified second value and replaces the modified first value stored in the memory with the modified second value; and
generates signals to cause the wireless communication interface to transmit the second dynamic code and the univocal code stored in the memory.

2. The device according to claim 1 wherein said memory stores a Fully Qualified Domain Name (FQDN), and said transmitting said univocal code and said first dynamic code comprises:
transmitting an Uniform Resource Locator (URL) to a reader device, said URL comprising said Fully Qualified Domain Name, said univocal code and said first dynamic code.

3. The device according to claim 1 wherein said processing circuitry, in operation, generates the first dynamic code using one or more of:
a symmetric encryption function;
an asymmetric encryption function; and
a hashing function.

4. The device according to claim 3 wherein the processing circuitry, in operation, generates said first dynamic code by:
generating a temporary code based on the univocal code and the first value using a cryptographic algorithm; and
selecting a subset of the characters of said temporary code as said dynamic code.

5. The device of claim 4 wherein the cryptographic algorithm comprises at least one of:
a Data Encryption Standard (DES) algorithm; and
an Advanced Encryption Standard (AES) algorithm.

6. The device according to claim 1 wherein said wireless communication interface comprises a Near Field Communication interface.

7. The device of claim 1 wherein the processing circuitry, in operation, generates the first dynamic code before generating the modified first value.

8. A method, comprising:
generating, using processing circuitry of a tag, a first dynamic code based on a first key and a first value stored in a memory of the tag;
applying a determined operation to the first value to generate a modified first value and replacing the first value stored in the memory with the modified first value;
transmitting, using a wireless communication interface of the tag, the first dynamic code and a univocal code stored in the memory of the tag; and
repeating, using the modified first value instead of the first value, the generating of a dynamic code, the applying of the determined operation and the replacing, and the transmitting.

9. The method of claim 8 wherein said memory stores a Fully Qualified Domain Name (FQDN), and said transmitting said univocal code and said first dynamic code comprises:
transmitting an Uniform Resource Locator (URL) to a reader device, said URL comprising said FQDN, said univocal code and said first dynamic code.

10. The method of claim 8 wherein generating the first dynamic code comprises applying one or more of:
a symmetric encryption function;
an asymmetric encryption function; and
a hashing function.

11. The method according to claim 10 wherein the generating said first dynamic code comprises:
generating a temporary code based on the univocal code and the first value using a cryptographic algorithm; and
selecting a subset of the characters of said temporary code as said dynamic code.

12. The method of claim 11 wherein the cryptographic algorithm comprises at least one of:
a Data Encryption Standard (DES) algorithm; and
an Advanced Encryption Standard (AES) algorithm.

13. The method of claim 8 wherein said wireless communication interface comprises a Near Field Communication interface.

14. The method of claim 8, comprising:
receiving, at a server, a Uniform Resource Locator (URL) request including the transmitted first dynamic code and univocal code;
determining, by the server, whether a database contains said univocal code included in the received URL; and
in response to a determination that the database contains the univocal code included in the received URL:
retrieving a second key and a second value stored in the database and associated with said univocal code included in the received URL;
generating a second dynamic code as a function of said retrieved second key and the second value stored in said database;
comparing said first and said second dynamic codes; and
based on the comparison, selectively applying the determined operation to the second value to generate a modified second value and replacing the second value stored in the database with the modified second value.

15. The method according to claim 14, comprising:
transmitting the URL by the tag to a reader device; and
transmitting the URL by the reader device to the server.

16. The method of claim 15 wherein said reader device is one of a smartphone and a tablet.

17. The method according to claim 14, comprising:
in response to a determination that the database does not contain the univocal code included in the received URL, transmitting, by the server, a webpage containing an error message.

18. The method according to claim 14, comprising:
when the comparison indicates said first and said second dynamic codes do not correspond, repeating the following operations until the comparison indicates said first and said second dynamic codes correspond or a threshold number of iterations has been reached:
applying the determined operation to the second value to generate a modified second value; and
generating a new second dynamic code as a function of said key and said modified second value.

19. The method according to claim 18, comprising:
when the threshold number of iterations has been reached, transmitting, by the server, a webpage containing an error message.

20. A system, comprising:
an object;
a tag associated with the object, the tag including:
a wireless communication interface;
a memory; and
processing circuitry which, in operation:
generates a first dynamic code based on a key and a first value stored in the memory;
applies a determined operation to the first value to generate a modified first value and replaces the first value stored in the memory with the modified first value;
generates signals to cause the wireless communication interface to transmit the first dynamic code and a univocal code stored in the memory; and
repeats, using the modified first value instead of the first value, the generating of a dynamic code, the applying of the determined operation and the replacing, and the generating of signals.

21. The system according to claim 20 wherein the tag is embedded in the object.

22. The system of claim 20, comprising:
a server, which, in operation, responds to a Uniform Resource Locator including the transmitted first dynamic code and the univocal code by authenticating the object based on the received URL.

23. The system of claim 20, comprising:
a server, which, in operation, responds to receipt of a Uniform Resource Locator (URL) request including the transmitted first dynamic code and univocal code by:
determining whether a database contains said univocal code included in the received URL; and
in response to a determination that the database contains the univocal code included in the received URL:
retrieving a second key and a second value stored in the database and associated with said univocal code included in the received URL;
generating a second dynamic code as a function of said retrieved second key and second value stored in said database;
comparing said first and said second dynamic codes; and
based on the comparison, selectively applying the determined operation to the second value to generate a modified second value and replacing the second value stored in the database with the modified second value.

24. The system of claim 23 wherein the server, in operation, responds to a comparison indicating said first and said second dynamic codes do not correspond by repeating the following operations until the comparison indicates said first and said second dynamic codes correspond or a threshold number of iterations has been reached:

applying the determined operation to the second value to generate a modified second value; and generating a new second dynamic code as a function of said key and said modified second value.

\* \* \* \* \*